G. E. BURT.
Methods of Lacing Belts.
No. 153,153.
Patented July 21, 1874.
Fig. 1.
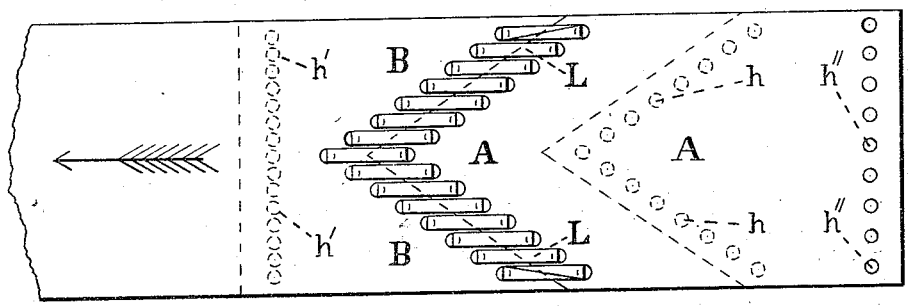
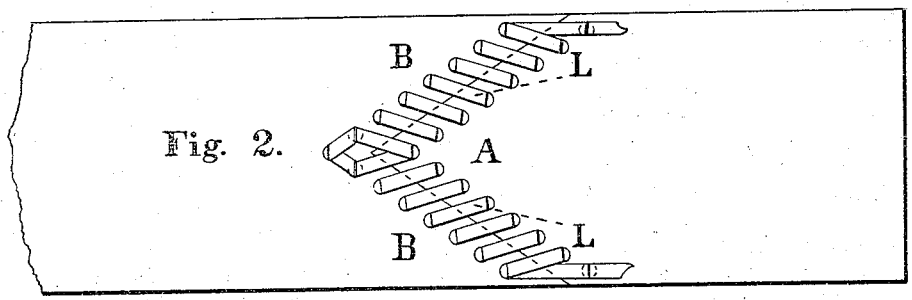
Fig. 2.
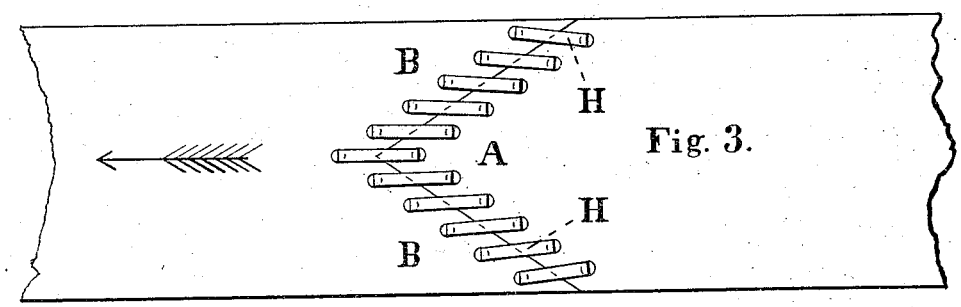
Fig. 3.
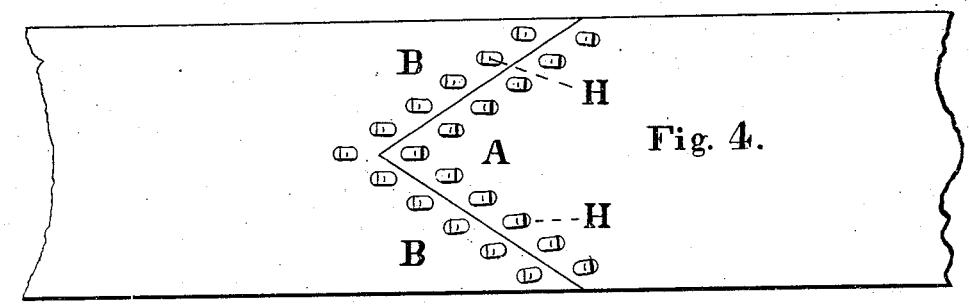
Fig. 4.
Witnesses
Edwin A. Hildreth.
Stanley B. Hildreth.
Inventor,
George E. Burt.

UNITED STATES PATENT OFFICE.

GEORGE E. BURT, OF HARVARD, MASSACHUSETTS.

IMPROVEMENT IN THE METHODS OF LACING BELTS.

Specification forming part of Letters Patent No. 153,153, dated July 21, 1874; application filed March 31, 1874.

*To all whom it may concern:*

Be it known that I, GEORGE E. BURT, of Harvard, in the county of Worcester and State of Massachusetts, have invented certain Improvements in Lacing Belts and in uniting the two ends with belt-hooks, of which the following is a specification:

My invention relates to the joint or fastening which is made between the two extremities of a belt, when either lacings or belt-hooks are used to form an endless belt. The nature of my invention is such that a much stronger joint is formed than by the usual method of lacing or joining by belt-hooks. The joint, by my invention, passes over a pulley more easily, with less noise, with less wear to the lacing or belt-hooks, with less liability of jamming or scratching the pulley, and with less jar in passing rapidly over small pulleys. The nature of my invention is also such that the joint in the belt can be run through shippers without the usual liability of catching on the shipper, without injuring the belt, and without jarring the machinery which is being operated.

Figure 1 is a face view of the two ends of a belt joined by a lacing and embodying my invention. Fig. 2 is a view of the under side of the same, as shown in Fig. 1. Fig. 3 is a face view of the two ends of belt joined by belt-hooks and embodying my invention. Fig. 4 is a view of the under side of the same, as shown in Fig. 3.

A represents one end of the belt to be joined, and B B represent the other end, to which the end A is to be united.. If an endless belt is desired, the ends A and B B represent the two extreme ends of a single piece of belting. In Figs. 1 and 2, L L represent a belt-lacing or thong, which is made of strong calf-skin or of other suitable material, and is run through the holes in the ends of the belts A and B B. In Figs. 3 and 4, H H represent belt-hooks, which are made of any suitable metal, and are placed in holes and connect the two parts of the belt A and B B.

Each belt-hook H can have a double hold in each end of the belt, if desired, by making another row of holes and using hooks adapted to a double row.

I do not confine my invention, however, to any particular kind of belt-hook, as I can use in this joint any of the various kinds in general use.

In Fig. 1, the dotted row of holes $h\,h$ and dotted line parallel with the line of these holes show the shape in which, by my invention, I cut the end of the belt A, and the shape in which I punch the holes $h\,h$ before commencing to lace the joint. The dotted row of holes $h'\,h'$ in Fig. 1 shows what the result would be were as many holes for lacings cut in a straight line across the belt as I am enabled to use in forming my joint. The dotted row $h'\,h'$ nearly cuts off the belt and injures its strength. In Fig. 1, the row of holes $h''\,h''$ are placed at the same distance apart as they are in the row $h\,h$, showing that if the same distance apart be maintained in a straight line directly across the belt, as in $h''\,h''$, fewer holes can be obtained than by the method shown by the row $h\,h$.

The belt should run in the direction of the arrows in Figs. 1 and 3. The common method of lacing belts or uniting them by belt-hooks is to cut off each end square, punch holes in lines parallel with these square ends, and then, abutting these ends against each other, unite them by belt-hooks or by lacings, as the case may be. The common lacing makes a thick place directly across the belt, which raises the belt off from the pulley when the lacings reach it, oftentimes with considerable jar, as the ends of all the stitches strike the pulley about the same time. The common lacing acts like a block when it strikes the pulley, and if the belt is under great strain, there is a tendency to make the belt slip when the lacing strikes the pulley, which wears out the lacings very fast.

In my improved method of lacing, the middle stitch strikes the pulley first and raises a portion of the belt to allow the sewing to pass over the pulley. Experiments have shown that a high-speeded belt united with this improved lacing runs very much stiller and with less jar than the common lacing, showing that there must, therefore, be less wear on the lacing itself. As I obtain several more stitches without bringing the holes nearer together, the lacing in my joint is much stronger to resist any direct strain than the common lacing; and I anticipate that the lacing will, for the reasons above given, wear much longer than in the common joint, as the friction of a pulley sliding on a lacing is more injurious than simply bending the joint or submitting it to a direct strain.

Another important advantage of this improved joint is, that the corners of the belt cannot jam against a shipper. When the belt is run in the direction of the arrows, the covering parts B of the V-shaped lacing cover and protect the following part A. This striking of the corners of a joint united by lacings or belt-hooks has caused great strain on the stitches, sometimes tearing them out of the holes in the belt. This strain and trouble in the joint from using shippers are almost wholly avoided by the use of this improved joint, with the leading end of the belt formed to cover and protect the following end.

The difficulty in making lacings or hooks hold the ends of belts together properly has heretofore been so great that large and important belts have often been joined and cemented together at great expense, because of the danger of delay from the breaking or wearing out of the lacings or belt-hooks.

I claim as my invention—

The mode of lacing belts, consisting in cutting the ends to be joined, one with a convex and the other with a correspondingly concave face, punching holes, and uniting by lacing or suitable securing devices, substantially as described.

GEORGE E. BURT.

Witnesses:
EDWIN A. HILDRETH,
STANLEY B. HILDRETH.